INVENTOR
William A. Ray
BY John Flam
ATTORNEY

INVENTOR
William A. Ray
BY John Flam
ATTORNEY

Oct. 28, 1952 W. A. RAY 2,615,511
AUTOMATIC PRESSURE CONTROLLED VALVE
SYSTEM FOR FLUID FUEL BURNERS
Filed Dec. 7, 1946 5 Sheets-Sheet 4

INVENTOR
William A. Ray
BY John Flam
ATTORNEY

Oct. 28, 1952     W. A. RAY     2,615,511
AUTOMATIC PRESSURE CONTROLLED VALVE
SYSTEM FOR FLUID FUEL BURNERS
Filed Dec. 7, 1946     5 Sheets-Sheet 5

INVENTOR
William A. Ray
BY John Flam
ATTORNEY

Patented Oct. 28, 1952

2,615,511

UNITED STATES PATENT OFFICE 2,615,511

AUTOMATIC PRESSURE CONTROLLED VALVE SYSTEM FOR FLUID FUEL BURNERS

William A. Ray, North Hollywood, Calif., assignor to General Controls Co., a corporation of California Application December 7, 1946, Serial No. 714,794

22 Claims. (Cl. 158—131)

This invention relates to a system for supplying fuel to a burner, such as a main gas burner.

It is common to provide a pilot burner that is intended at all normal times to be used to ignite a main burner, when gas or other fluid fuel is passed to the burner. Accidental blowing out of the pilot flame may occur. Safety systems have heretofore been proposed and used to interrupt the flow of fuel to the main burner. Usually this is accomplished by the aid of a thermoelectric generator operated by the heat of the pilot flame for maintaining the system in operation. When the generator cools, due to the failure of the pilot flame, a safety valve is closed, stopping flow of fuel to the system. To initiate operation of the burner, the pilot burner must be relighted, but the safety valve cannot be opened until after the pilot flame is in existence and the thermoelectric generator is active.

It is one of the objects of this invention to improve, in general, systems of this general character.

It is another object of this invention to simplify the operation of resetting the system after pilot flame failures.

It is convenient to use a rotary plug valve for controlling the rate of flow to the main burner. It is another object of this invention to incorporate with such a valve a safety valve that shuts off all fuel to both the pilot and main burners in the event of pilot flame failure.

It is still another object of this invention to provide a combination safety valve and plug valve in which the operation of the safety valve is effected in a simple and inexpensive manner by the aid of fluid pressure derived from the source of fuel supply.

It is still another object of this invention to provide a system in which opening and closing of the safety valve occurs, in normal operation, in response to operation of a limiting control, such as a room thermostat.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings.

Figure 2:
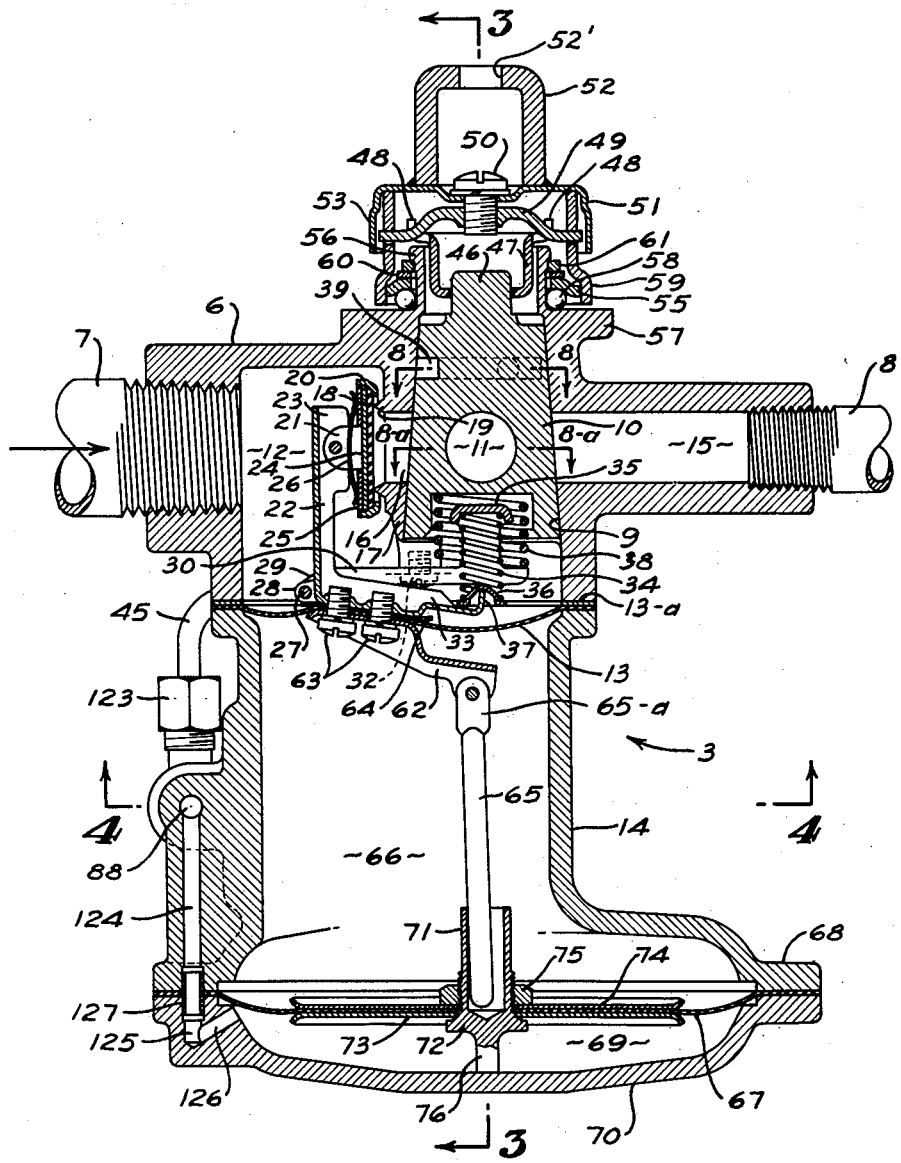
Fig. 2 is a vertical section of a valve structure utilized in connection with the system.
Figure 3:
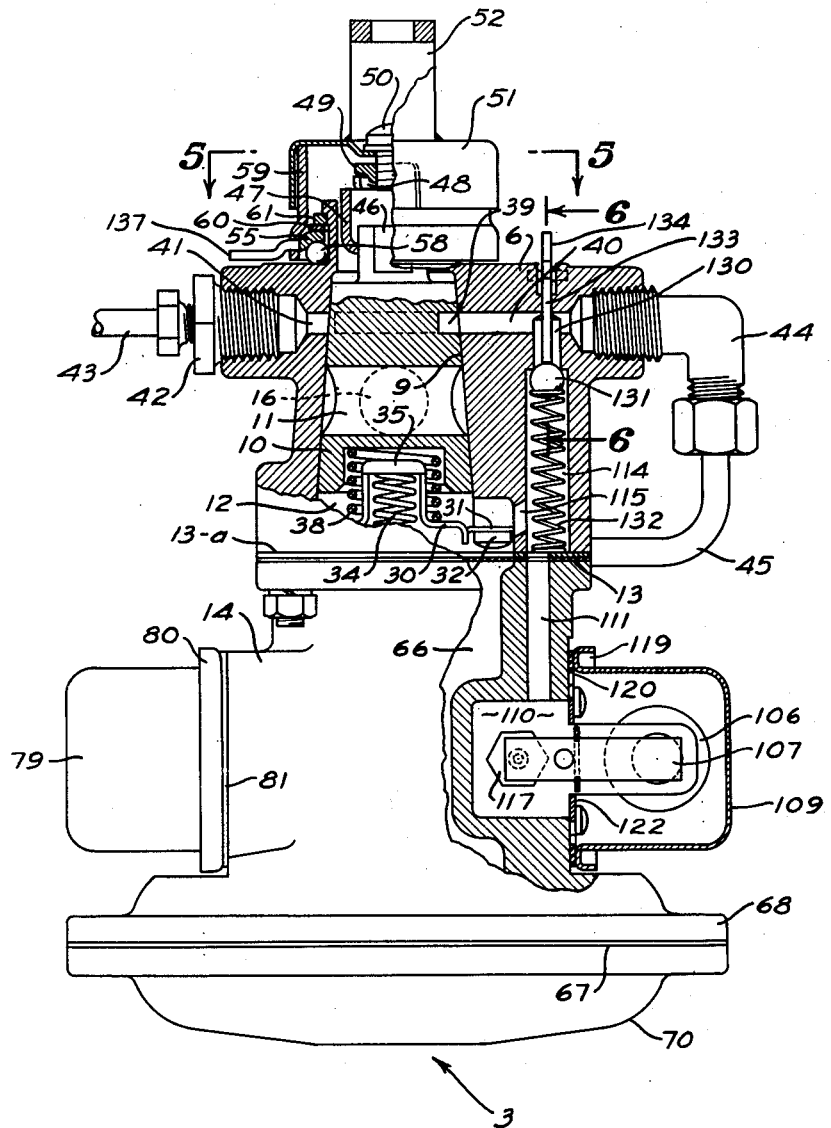
Fig. 3 is a view, partly in section, the plane of the section being indicated by line 3—3 of Fig. 2.
Figure 7:
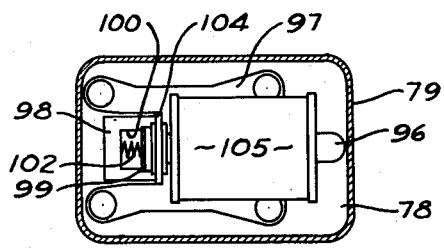
Figure 5:
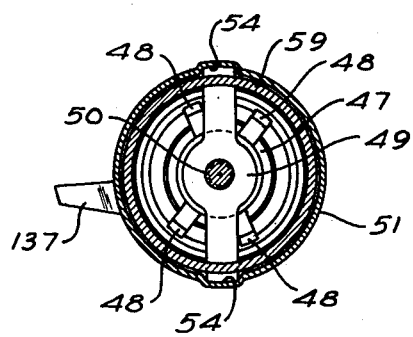
Figure 6:
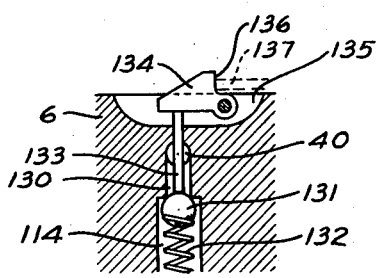
Figure 4:
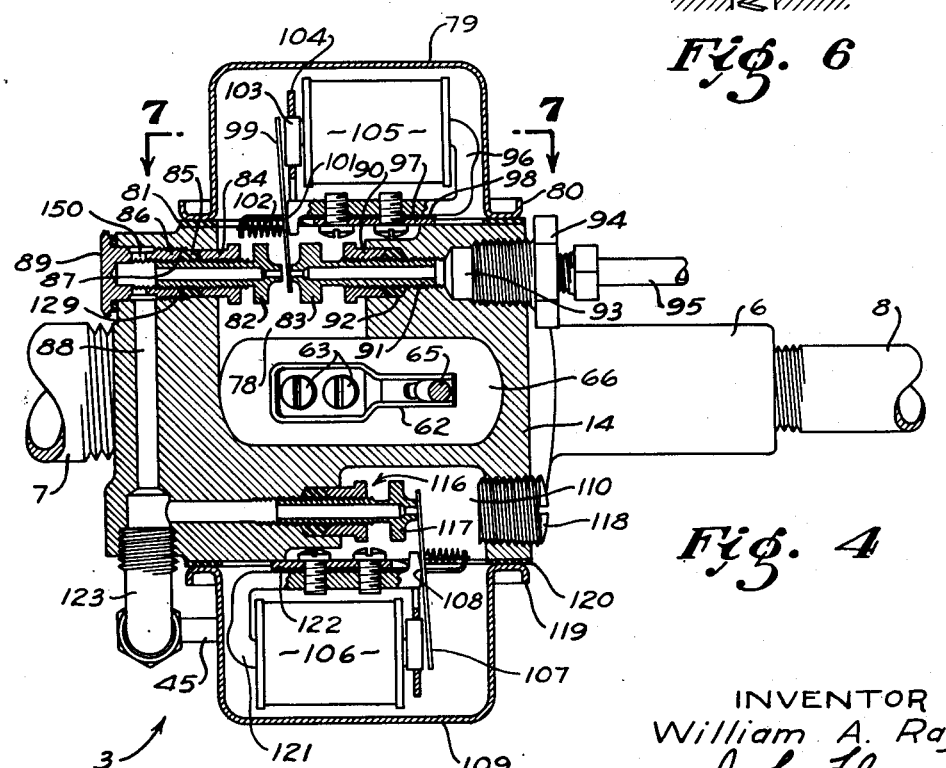
Fig. 4 is a horizontal section, taken along a plane indicated by line 4—4 of Fig. 2.
Figures 8, 9, 10:
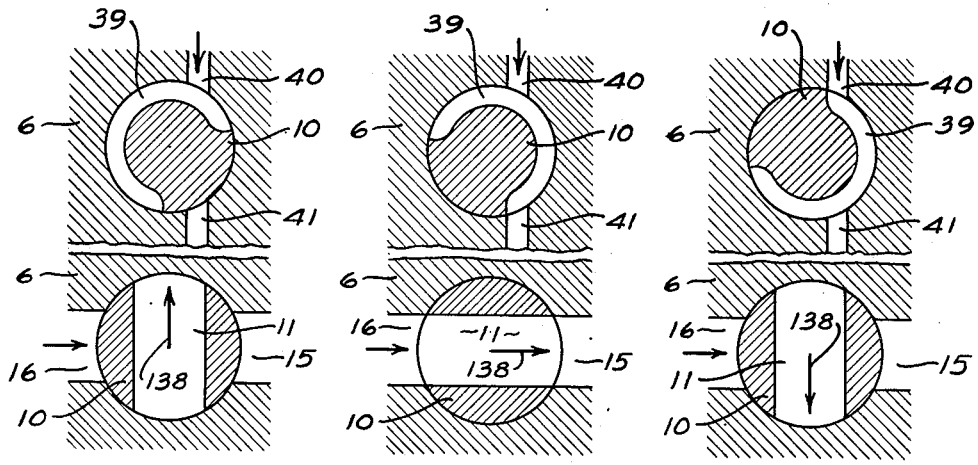
Figure 11:
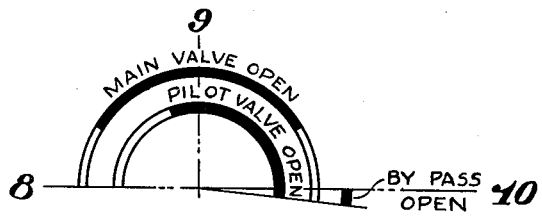

Figs. 5 and 6 are fragmentary sectional views, taken along planes respectively corresponding to line 5—5 and line 6—6 of Fig. 3;

Fig. 7 is a sectional view, taken along the plane indicated by line 7—7 of Fig. 4;

Figs. 8, 9, and 10 are diagrammatic sectional views, of successive valve positions, the upper portions of these figures corresponding to sections represented by line 8—8 of Fig. 2; and the lower portions corresponding to sections represented by line 8a—8a of Fig. 2; and Fig. 11 is a diagram showing the sequences of the valve operation.

Figure 1:
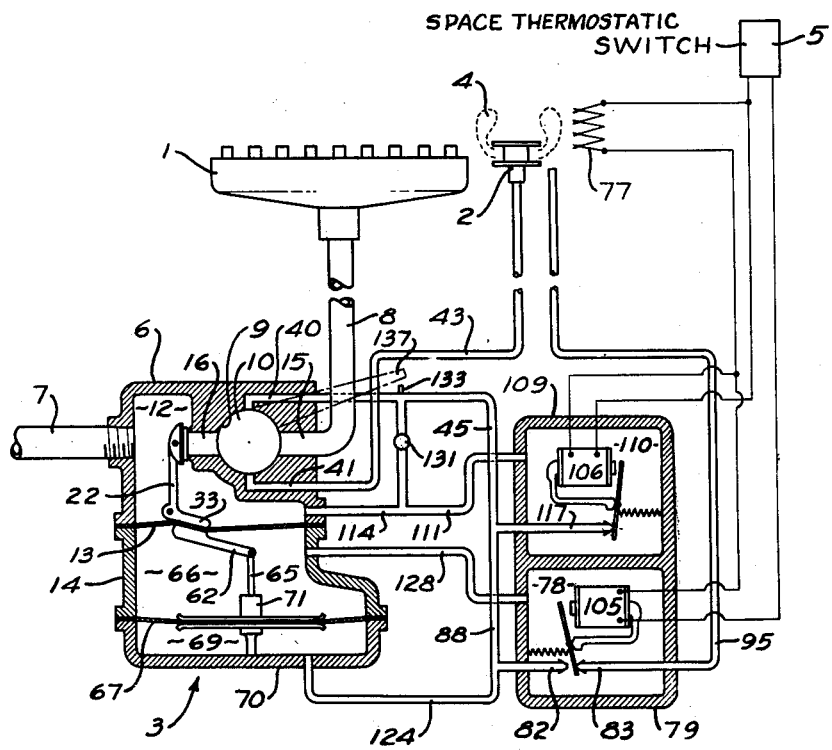
Figure 1 is a diagrammatic representation of a system embodying the invention.

The system includes a main gas burner 1 and a pilot burner 2 (Fig. 1). A valve structure 3 is indicated for controlling the supply of fuel to the burners.

This valve structure is such that, upon failure of the pilot flame 4, a supplemental or safety valve structure is caused to close, interrupting the flow of fuel to both burners 1 and 2. The normal operation, controlling the flow of fuel, cannot then be re-established until the pilot flame 4 has been lighted.

Passage of fuel to the main burner 1 can be effected only when a limit switch 5, such as a thermostat, closes a circuit. The thermostat 5 may be located in a space to be heated. When the temperature is below that desired, the thermostat 5 closes a switch, and thereby causes fuel to be supplied to the burner 1. When the temperature of the space being controlled has increased sufficiently, the thermostat 5 opens the circuit, and flow of fuel to the main burner is interrupted.

Independently of the limit switch 5, the flow of fuel to the main burner 1 is also subject to the opening of a plug valve structure. This plug valve is shown as manually operated, and is incorporated in the valve structure 3.

Thus, as shown most clearly in Figs. 2 and 3, the valve structure 3 has a valve body 6 having an inlet conduit or pipe 7 and an outlet conduit or pipe 8. The pipe 7 leads to a source of gaseous fuel; the pipe 8, as shown in Fig. 1, leads to the main burner 1.

Within the body 6 there is a chamber 12 in direct communication with the inlet pipe 7. This chamber is closed by a flexible wall or diaphragm 13 that forms the lower boundary for the chamber 12. A gasket 13-a may be interposed between the wall 13 and the body 6.

Beneath the wall 13 a fluid pressure operating mechanism is provided, which is housed in a casing 14. This fluid pressure operating mechanism is utilized for controlling a safety or supplemental valve closure enclosed in the chamber 12, and which will be hereinafter described in detail.

A conical valve seat 9 is provided in the body 6. Opening into the valve seat 9 is a port 15 that is in communication with the outlet conduit 8. A plug valve closure 10 is rotatably mounted in seat 9. Diametrically opposite the port 15 there is an inlet port 16 that opens into the chamber 12. The wall 17, in which the port 16 is provided, is formed as a boss extending downwardly from the top of the body 6.

In order that gaseous fuel be passed from the fuel filled chamber to the outlet pipe 8, the plug valve closure 10 must be rotated to bring its port 11 into at least partial register with the ports 15 and 16. Furthermore, the port 16 must be open to the chamber 12.

In the inactive position shown in Figs. 2 and 8, the closure 10 is in such position that the passage between ports 15 and 16 is interrupted; and, furthermore, the left-hand side of port 16 is closed by a supplemental valve structure, hereinafter described, preventing flow of fuel to port 16 from chamber 12. Thus there is a double closure between pipe 7 and outlet 8.

The supplemental valve structure has a disc-like closure 18 formed of a yielding material such as rubber, and arranged to be seated on a narrow annular valve seat 19 formed on the wall 17 around port 16. The valve closure 18 is shown as accommodated in a ring 20 having a plurality of inwardly directed fingers forming an abutment for the closure disc 18. A backing, such as a metal disc 24, is placed against the closure 18. An ear 21 is carried by the disc 24 by the aid of which the entire closure structure is pivoted to a lever arm 22. This lever arm 22 is of channel section, provided with the flanges 23. The ear 21 projects between these flanges.

In order to urge the closure member 18 against the fingers on ring 20, a metal disc 25 is disposed in contact with the left-hand side of the disc 24, through which the ear 21 passes. A bowed spring 26 urges the members 18, 24, and 25 toward valve seating position, and takes up any clearances. Ear 21 passes through an opening in spring 26.

The pivot pin 27 for the lever 22 is located within the chamber 12 and passes through an ear 28 carried on the back of the arm 22. The pin also passes through the ears 29 carried at the left-hand extremity of a stationary support 30. This support 30, as shown most clearly in Fig. 3, may be appropriately formed of sheet metal having an extension 31 at each side thereof. These extensions 31 are provided with apertures for the passage of the fastening screws 32 threaded into a portion of the valve body 6.

The lever arm 22 is formed integrally with another arm 33 forming a lever. This arm 33 is urged by compression spring 34 in a clockwise direction to close the supplemental valve. Accordingly, unless some force is exerted to move the arms 22 and 33 in a counter-clockwise direction, the compression spring 34 will cause seating of the disc 18 upon the seat 19.

The upper end of the spring 34 abuts a stationary strap 35 formed integrally with the member 30. The lower end of spring 34 is in contact with the cup 36 into which the upwardly turned end 37 of the lever arm 33 extends.

Furthermore, in order to seat and seal the plug 10 in the seat 9, a compression spring 38 is provided, the upper end of which is accommodated in a recess in the bottom of the plug 10. Its lower end rests upon the member 30.

The plug valve 10 has a supplemental arcuate port 39 adjacent its upper edge. The configuration of this arcuate port is shown to best advantage in Figs. 8, 9, and 10. This port is in the form of a groove opening in the exterior surface of the plug 10 and extends for an angular distance of over 180°. It serves to control the passage of fuel to the pilot burner 2.

Cooperating with this annular port 39 are the inlet port 40 and the outlet port 41 formed in the body 6. The outlet port 41 is connected by an appropriate pipe coupling structure 42 threaded in body 6, to a conduit 43 that leads to the pilot burner 2. The inlet port 40 communicates with an elbow 44 threaded in body 6. A conduit 45 is connected to the elbow 44. This conduit 45, as will be explained hereafter, may be placed in communication with the chamber 12 and thereby to transmit the fuel to the pilot burner 2, through ports 40 and 41. During normal operation of the system, fuel passes through conduit 45 into the inlet port 40 to port 39, thence to the outlet port 41 and the outlet pipe 43 to the pilot burner 2. The angular movement of the plug 10 is such that the pilot ports 40 and 41 remain in communication, as shown most clearly in Figs. 8, 9, and 10.

The plug 10 can be angularly moved to close and open the main valve. This may be done manually by the aid of a handle connected to the upper extension 46 of the plug 10. This extension 46 is non-circular, as by being provided with flattened sides indicated most clearly in Fig. 3. Cooperating with this extension 46 is an operating member 47 having an aperture conforming with the contour of the projection 46. The member 47 is of cup shape. Projecting radially outwardly from the upper edge of the member 47 are a plurality of ears 48 (see also Fig. 5) having upturned extremities. These ears 48 are adapted to cooperate with a cross piece 49 passing between the ears. This cross piece extends diametrically across and beyond the cup member 47.

Member 49 serves as the operating member which, when rotated about the axis of plug 10, serves to engage diametrically opposite ears 48. For a purpose to be hereinafter described, there is a small angular lost motion between ears 48 and cross piece 49. Thus, in the position of Fig. 5, the cross piece is in contact with those ears which are displaced in a counter-clockwise direction from the cross piece 49. Upon clockwise movement of the cross piece 49, the opposite ears are contacted, after a limited lost motion, and a force may then be exerted to rotate the plug 10 in a clockwise direction to open the valve.

The cross piece 49 is rotatably supported in a manner now to be described. Thus, it is fastened as by a screw 50 to the lower side of a handle member 51. This handle member 51 is in the form of a flanged disc. Attached to its upper surface is a U-shaped strap 52, by the aid of which it may be grasped by the hand of the operator. It has a non-circular aperture 52' for the reception of a wrench.

The flange 53 of the handle member 51 is formed with oppositely directed recesses 54 (Fig. 5) for accommodating the ends of the cross piece 49 so as to couple these elements together. The ends of the cross piece 49 also extend through clearance apertures in the shell 59, which telescopes into flange 53. By tightening screw 50, the upper edge of shell 59 can be urged into contact with handle member 51. Shell 59, at its lower end, carries an upper ball race 55. The lower ball race is formed between the neck 56 of the body member 6 and the flange 57 extending radially outwardly from the neck. The ball race 55 may be attached, as by welding, to the shell 59. Balls 58 are confined between the race 55 and the flange 57.

The ball races are held in proper cooperative relation by the aid of a washer 60 and a split retaining ring 61 disposed below the overhanging flange of the neck 56.

The structure is thus freely rotatable with respect to the body 6 about the axis of plug 10. Rotation of the handle structure then causes angular operation of the cross piece 49, which, in turn, is coupled to the cup-shaped member 47. By appropriate manipulation of the handle structure, the plug valve can be controlled.

The safety valve structure, including the lever arms 22 and 33, is arranged to be operated by fluid pressure derived from the source of fluid fuel. For this purpose an arm 62, located beneath the diaphragm 13, is attached to the arm 33. This is accomplished by the aid of several screws 63 that pass through the diaphragm, as well as through apertures in the arm 62, said screws being threaded into the arm 33. A gasket member 64 may be interposed between the arm 33 and the upper surface of the wall 13.

A link 65 is pivoted, as by a clevis 65-a, to the extremity of arm 62. The link, when the safety valve is closed, hangs freely from arm 62. The link 65 and the arm 62 are contained in a pressure chamber 66 in casing 14, and sealed as by a flexible diaphragm 67. In order to maintain the diaphragm in place, the casing 14 is provided with a flange 68. The lower side of the diaphragm defines a pressure chamber 69 formed by the aid of a cap 70 and appropriately fastened to the flange 68. For opening the supplemental valve a thrust is imparted to the link 65 by upward movement of the diaphragm 67. This occurs when the pressure in chamber 69 overpowers the pressure in chamber 66.

To provide a coupling between the diaphragm 67 and link 65, this diaphragm carries a cup 71 which passes upwardly through the diaphragm and into which the lower end of the link 65 extends. Interposed between the flange 72 of the cup 71 and the lower surface of the diaphragm 67 is a metal disc 73. A similar disc 74 is disposed above diaphragm 67. A nut 75, threaded on the exterior of the cup 71, holds the assembly in place. The lower end of the cup is provided with a projection 76 and is adapted to rest on the bottom of the cap 70 when the apparatus is in the inactive position of Fig. 2.

Due to the provision of the spring 34, urging the lever arm 33 in a clockwise direction, the supplemental valve is closed when the chambers 66 and 69 have equal pressures. When the chamber 66 is vented and chamber 69 is connected to the source of fluid fuel, the pressure below the diaphragm 67 causes the cup 71 to lift and to impart a thrust to the link 65, thereby opening the supplemental valve.

The arrangement is such that the pressure in chamber 69 is effective only when two conditions exist. The first is the existence of the pilot flame 4, and the other is the closing of the control or limit switch 5. In order to provide such an automatic responsive system, use is made of a thermopile 77 (Fig. 1) which is arranged near flame 4, to generate electrical energy only while heated by the pilot flame 4. When the pilot flame 4 is in existence, electrical energy is available to operate control valves that determine the pressures in chambers 66 and 69.

These valves are operated by electromagnets. The structure of these valves can be best understood in connection with Figs. 3, 4, and 7.

As shown most clearly in Fig. 4, the chamber 66 has an extension 78 opening exteriorly of the body 14. In the diagram of Fig. 1, these chambers are indicated as separated, and connected by a connection 128. However, in the actual construction, no such supplemental connection is at all necessary. Chamber 78 is sealed by a shell or casing 79. A gasket 81 may be interposed between the flange 80 of the shell 79, and the casing 14.

Jet nozzles 82 and 83, having opposed jet openings, are supported in the wall of the casing 14, and open into chamber 78. Thus, the nozzle 82 has a hollow stem 87 threaded into a gland 84. The gland 84 telescopes within an aperture in the casing 14, and is in contact with the packing 85. A hollow packing screw 86 is threaded into the inner threaded portion of an aperture 129 of casing 14 and serves to compress the packing 85. Screw 86 has a cylindrical portion extended into aperture 129 in the body 14. A head 89 for the screw extends exteriorly of casing 14, to facilitate assembly, and suitable packing is provided below the head. This screw 86 is also in threaded engagement with the threaded stem 87. The interior of the stem 87 is in communication with the port 88 that extends transversely of the casing 14, through a series of radial apertures 150 transverse to the screw 86.

The nozzle 83 is quite similarly supported by the aid of the gland 90, threaded on the stem 91 of the nozzle and serving to compress the packing 92 disposed in the aperture in the wall of casing 14. The stem 91 is threaded into the wall and communicates with an enlarged threaded opening 93 into which a pipe coupling structure 94 is threaded. The pipe 95, connected to the coupling 94, is a vent pipe which extends, as shown most clearly in Fig. 1, near to the pilot burner 2.

By the aid of an electromagnet structure the opening and closing of the jets 82 and 83 can be effected. This electromagnet includes a core 96 that is supported on the bracket 97 (see, also, Fig. 7) supported on the edge of the chamber 78. Between the lower leg of the core 96 and the bracket 97 is clamped a supporting plate 98 that has a central slot 100 in which is supported a tiltable light armature 99. The edges of the armature 99 have slots engaging the edges of the opening 100. The armature is tiltable about a knife edge 101 formed at the left-hand end of the lower leg of the core 96. A light compression spring 102 urges the armature 99 away from the pole 103 of the core 96. This pole 103 is supported in the upright leg 104 of the bracket 97. The left-hand end of the compression spring 102 abuts the down turned end of the plate 98. Its right-hand end engages the armature 99 below the knife edge 101, thereby urging the armature 99 in a counter-clockwise direction.

The lower end of the armature 99 can move between the nozzles 82 and 83 to cover one nozzle and to uncover the other. Operating coil 105 is disposed over the upper leg of core 96. When coil 105 is not energized, the armature 99 covers the nozzle 83 and uncovers the nozzle 82. This electromagnet coil 105, as shown most clearly in Fig. 1, is connected in series with the thermoelectric generator 77 and the limit switch 5. Accordingly, it would be energized only when the pilot flame 4 is in existence and the limit switch 5 is in closed position, requiring more heat from the main burner 1.

Control of the nozzles 82 and 83, as will be hereinafter described, serves to control the relative pressures in chambers 66 and 69. Thus, during normal operation of the system with the pilot flame 4 in existence, the supplemental valve structure mounted on arm 22 is operated to open and to close in accordance with the position of the limit switch 5.

By the aid of another electromagnetically controlled nozzle under the direct control of the thermoelectric generator 77, the supplemental valve structure is caused to close upon pilot flame failure. This electromagnetic control is shown supported on the casing 14 in Fig. 4, and is also shown on the right-hand side of Fig. 3.

A cavity 110 (Figs. 3 and 4) is provided in the casing 14 and separated from the chamber 66. It is, however, in communication with the chamber 12 (serving as a source of fuel supply) through a port 111 (Fig. 3) in the casing 14, passage 114 in body 6, and a port 115 connecting passage 114 with the chamber 12. These ports are shown to best advantage in Fig. 3.

The chamber 110 serves to accommodate a nozzle structure 116, generally similar to those already described in connection with nozzles 82 and 83. The nozzle 117 in this case is supported in a wall of the casing 14, and its interior is in communication with the passage 88 that also communicates with the nozzle 82. In order to facilitate assembly, a tapered plug 118 is provided, closing an opening in the chamber 110, which opening is large enough to pass the nozzle structure.

The chamber 110 is sealed by the aid of a shell or housing 109 having a flange 119 that engages the gasket 120 interposed between the casing 14 and the housing 109. The housing 109 serves to enclose the coil 106 which is mounted on one of the legs of the core 121 for operating the armature 107. The electromagnet structure being quite similar to that already described in connection with the coil 105, it is not necessary to describe the remaining portions of the structure in detail, except to state that the core 121 is provided with a knife edge 108 upon which the armature 107 is pivoted. A bracket 122, similar to the bracket 97, is supported on the edge of the chamber 110 for holding the core 121 and its associated parts in place.

The coil 106 is directly in series with the thermoelectric generator 77. Accordingly, the covering and uncovering of the nozzle 117 is dependent upon the existence of the pilot flame 4.

The passage 88, as shown most clearly in Figs. 3 and 4, and which leads to the nozzles 82 and 117, is connected by the pipe 45 to the elbow 44, as by the aid of an elbow 123.

This passageway 88 is also connected, as by way of a port 124 (Fig. 2) with chamber 69. This is accomplished by the aid of the ports 125 and 126 in cap 70. A short sleeve 127 extends through the contacting surfaces of the diaphragm 67, casing 14, and cap 70 so as to ensure against leakage past these surfaces.

In the diagram of Fig. 1, the connections between the various chambers have been indicated, although they do not exactly conform with the structure. For example, chamber 66 is shown as connected by a conduit 128 with chamber 78 enclosing the nozzles 82 and 83 with their associated parts.

With the system as thus far described let it be assumed that the pilot flame 4 is not in existence. Accordingly, the coils 105 and 106 are de-energized. Nozzle 83 is covered, nozzle 82 is uncovered, and nozzle 117 is covered. Normally, fluid pressure can be exerted from chamber 12 to the lower side of the diaphragm 67 through port 115 (Fig. 3), passage 114, port 111, chamber 110, nozzle 117, passage 88 (Fig. 4) and ports 124, 125, and 126. However, since it is assumed that pilot flame 4 is not in existence, the nozzle 117 is covered and, therefore, no fuel can pass to chamber 69. Furthermore, the pressures in chambers 66 and 69 are equalized through the passage 128, chamber 78, nozzle 82, passage 88, passage 124, and ports 125 and 126. Accordingly, the compression spring 34 (Fig. 2) is effective to close the supplemental valve 18, 19.

Flow of fuel to the pilot burner 2 is also interrupted by the covering of nozzle 117. Normally, the flow of fuel to the pilot burner would be derived from chamber 12, port 115, passageway 114, chamber 110, nozzle 117, passageway 88, elbow 123, connection 45, ports 40, 39 and 41, and connection 43. Since nozzle 117 is covered, the flow of fuel to the pilot burner 2 is interrupted.

In this shut-down position, it is necessary to reset the apparatus manually by initiating flow of fuel to the pilot burner 2 and by igniting the pilot burner 2. This is effected by providing a by-pass around the nozzle 117 so that fuel may flow from chamber 12 to the port 40 without passing through the nozzle 117.

For this purpose, a by-pass valve is arranged adjacent the top of the passage 114, as shown in Fig. 3. Thus, passage 114 leads to the port 40 through an opening 130. This opening 130, being smaller in diameter than passage 114, provides a seat for a ball valve 131. This ball valve is urged normally to seated position by the aid of the compression spring 132 that rests upon the upper surface of the gasket 13-a. As shown most clearly in Figs. 3 and 6, the ball may be depressed by the aid of a push rod 133 guided in the wall of the body 6 above the port 40. Push rod 133 may be urged downwardly by a lever 134 pivoted in a recess 135 in the upper surface of the body 6. The lever has a surface contacting the upper end of the push rod 133, and it also has a surface 136 adapted to be engaged by an actuator 137.

This actuator 137 is shown in diagrammatic form in Fig. 1. It is carried, as shown most clearly in Figs. 3 and 5, by the shell 59. Accordingly, this actuator 137 can become effective by rotating the handle structure in a clockwise direction through 180° as viewed in Fig. 5, until it engages the lever 134. Since actuator 137 is fastened to shell 51, rotation of the handle structure in a clockwise direction from Fig. 5 is immediately effective to move this actuator. As before stated, there is a little lost motion between cross piece 49 and ears 48; accordingly, actuator 137 contacts lever 134 before the valve plug 10 reaches the position of Fig. 10. Further rotation of the handle causes actuator 137 to open the by-pass valve 131 against the force of spring 132. This open position corresponds to Fig. 10.

This 180° rotation of the plug is indicated diagrammatically in Figs. 8, 9, and 10. The upper and lower portions of the figures illustrate the corresponding simultaneous position of the ports 11 and 39.

Thus, in the shut-down position of Fig. 8, there is a complete interruption of all fuel passage to the main burner 1 and the pilot burner 2. A rotation in a clockwise direction, as indicated by the varying positions of arrow 138 in plug 10, causes the port 39 to provide a passage between ports 40 and 41 for the pilot burner 2 and to align the port 11 with the ports 15 and 16. This is the fully opened position.

Nevertheless, the supplemental valve being still closed, no flow of fuel to either of these burners can be effected. To start the operation, the plug 10 is rotated to the fully closed position of Fig. 10. In this position, the pilot burner can be supplied with fuel through ports 40 and 41. In this position, the actuator 137 opens the by-pass valve 131. Then the fuel is passed to burner 2, and it may be lighted.

The various positions of the main and pilot valves and the by-pass valve are indicated diagrammatically in Fig. 11. In the fully closed position illustrated by line 8, none of the valves are open. As illustrated by line 9, corresponding to Fig. 9, both the pilot valve and the main valve have opened. The pilot valve remains open, however, upon further rotation toward the position illustrated by line 10. The main valve being closed by movement in a clockwise direction, the by-pass 131 is caused to open. Under such circumstances, flow of fuel only to the pilot burner 2 is effected from chamber 12 through port 115, passage 114, by-pass valve 131, port 40, port 39, port 41, and pipe 43 to the burner 2. The handle 51 must be held to resist the force of spring 132 (Fig. 6) to close the by-pass valve. As soon as the pilot burner 2 is ignited and the thermopile 77 is active, the handle can be released. Spring 132 then operates on lever 134 to move the handle in a counter-clockwise direction, to take up the lost motion between cross piece 49 and those ears 48 which are displaced from cross piece 49 in a counter-clockwise direction. The plug 10 is now under the direct control of the handle. The burner 2 being lighted and the pilot generator 77 being active, coil 106 is energized. This causes nozzle 117 to be uncovered. The plug 10 can be rotated in a counter-clockwise direction sufficiently to open the main valve, to the position of Fig. 9.

The system can now respond to the positions of the limit switch 5. When limit switch 5 is open, coil 105 is not energized. Assuming that limit switch 5 is open, nozzle 83 is covered and nozzle 82 is uncovered. As heretofore stated, the pressures in chambers 66 and 69 are equalized through passage 128, nozzle 82, passages 88, 124, and ports 125 and 126. Accordingly, the supplemental valve carried on lever 22 is in closed position.

As soon as limit switch 5 closes, nozzle 82 is covered and nozzle 83 is uncovered. In this position the chamber 66 is vented through vent 95. Chamber 69, however, derives fluid pressure through port 115, passage 114, passage 111, chamber 110, nozzle 117, passage 88, passage 124, and ports 125 and 126. The supplemental valve then opens and the main burner 1 is ignited.

The operations of limit switch 5, of course, are not effective unless the pilot flame 4 is in existence. If it is not in existence, coil 106 is de-energized and interrupts the flow of fuel through nozzle 117, and the system returns to the inactive position shown in Fig. 1, flow of fuel to both burners 1 and 2 being interrupted.

For resetting from the fully closed position of Fig. 8, the handle is turned clockwise from the position of Fig. 5 until cross pieces 49 contact those ears 48 that are displaced clockwise from cross piece 49. Thereafter, continued clockwise rotation brings the plug 10 ultimately to the position of Fig. 10, permitting lighting of the pilot burner.

The inventor claims:

1. In a valve structure for controlling fluid flow: a valve body having an inlet passage and an outlet passage; a flexible movable wall defining, with the body, a chamber, one of said passages communicating with said chamber; said body defining a plug closure seat having a transverse opening communicating with the chamber; a plug closure seated in the seat; a supplemental valve closure cooperating with said transverse opening; a lever system supporting the supplemental closure, one of the arms of the lever carrying the closure, and attached to that side of the flexible wall which defines the chamber; the other arm being attached to the other side of the wall; and means for operating said other arm.

2. In a valve structure for controlling fluid flow: a valve body forming a chamber and an inlet passage and an outlet passage, one of said passages communicating with said chamber, said body defining a plug closure seat having a transverse opening communicating with the chamber; a plug closure seated in the seat; a flexible movable wall sealing said chamber; a supplemental valve closure cooperating with said transverse opening; a lever system supporting the supplemental closure, one of the arms of the lever carrying the closure, and attached to that side of the flexible wall which defines the chamber, the other arm being attached to the other side of the wall; and means operated by the pressure of the controlled fluid, for moving said other arm.

3. In a fluid control system: a valve body; a rotary closure seated by the body; a pilot flame burner; a main burner; said rotary closure having separate ports respectively controlling the flow of fuel to the burners; a supplemental valve closure in the body for interrupting the flow of fuel through the port of the rotary closure for the main burner; means responsive to the existence of a pilot flame for holding said supplemental valve closure open, said means causing said supplemental valve closure to close upon failure of said pilot flame; a by-pass valve for the pilot burner, for passing fuel to the pilot burner when the supplemental valve closure is in closed position; and means operated by movement of the rotary closure to a position interrupting the flow of fuel to the main burner, for opening said by-pass valve.

4. In a fluid fuel control system: a valve body; a rotary closure seated by the body; a pilot flame burner; a main burner; said rotary closure having separate ports respectively controlling the flow of fuel to the burners; a supplemental valve closure in the body for interrupting the flow of fuel through the rotary closure for the main burner; means forming a pair of pressure chambers, including a movable wall between the chambers; means co-operating with the wall for opening the supplemental valve in response to movement of the wall occasioned by pressure conditions in the chambers; and means controlling the pressures in the chambers, responsive to pilot flame failure, to cause the supplemental valve to close, and responsive to the existence of the pilot flame, for urging the supplemental valve to open position.

5. In a fluid fuel control system: a valve body; a rotary closure seated by the body; a pilot flame burner; a main burner; said rotary closure having separate ports respectively controlling the flow of fuel to the burners; a supplemental valve closure in the body for interrupting the flow of fuel through the rotary closure for the main burner; means responsive to the existence of a pilot flame for holding said supplemental valve closure open, said means causing said supplemental valve closure to close upon failure of said pilot flame; a by-pass valve for the pilot burner, for passing fuel to the pilot burner when the supplemental valve closure is in closed position; means operated by movement of the rotary closure to a position interrupting the flow of fuel to the main burner, for opening said by-pass valve; and means responsive to the existence of the pilot flame for maintaining flow of fuel to the pilot burner even after said by-pass valve is closed.

6. In a fluid fuel control system: a main valve having a movable closure; a main burner controlled by the main valve; a pilot flame burner; valve means operated by movement of the closure for controlling passage of fuel to the pilot burner; a supplemental safety valve interrupting flow of fuel to the main burner; means in series with said valve means for controlling the flow of fuel to the said valve means, said means in series being responsive to the existence of a pilot flame to allow flow of fuel to said valve means and operating to interrupt said flow upon pilot flame failure; a second valve means controlled by movement of the closure for the main valve for by-passing said means that is in series with the valve means, and operable to permit flow of fuel through said valve means, in response to movement of the movable valve closure to a fully closed position of the main valve; and means effecting closure of said supplemental safety valve upon pilot flame failure.

7. In a fluid fuel control system: a main valve having a movable closure; a main burner controlled by the main valve; a pilot flame burner; valve means operated by movement of the closure for controlling passage of fuel to the pilot burner; a supplemental safety valve interrupting flow of fuel to the main burner; means in series with said valve means for controlling the flow of fuel to the said valve means, said means in series being responsive to the existence of a pilot flame to allow flow of fuel to said valve means and operating to interrupt said flow upon pilot flame failure; a second valve means controlled by movement of the closure for the main valve for by-passing said means that is in series with the valve means, and operable to permit flow of fuel through said valve means, in response to movement of the movable valve closure to a fully closed position of the main valve; and means effecting closure of said supplemental safety valve upon pilot flame failure, comprising a movable wall; means forming pressure chambers on opposite sides of the wall; means operating upon excess pressure in one chamber to cause the wall to move for urging the supplemental valve to open position; and means responsive to pilot flame failure equalizing the pressure in the two chambers.

8. In a fluid fuel control system: a main valve having a movable closure; a main burner controlled by the main valve; a pilot flame burner; valve means operated by movement of the closure for controlling passage of fuel to the pilot burner; a supplemental safety valve interrupting flow of fuel to the main burner; a pilot generator operated by the heat of the pilot flame; a pair of electromagnetically operated pressure control valve devices energized by said generator in parallel; a circuit controller in series with the first of said devices; and fluid pressure means operatively connected to said devices for opening said supplemental valve, including a movable pressure operated wall; means forming chambers on opposite sides of said wall; the first device when energized serving to vent one chamber to cause the wall to open the supplemental valve by pressure exerted by the fluid supply, the second device enabling passage of the fluid to operate the wall when said second device is energized, as well as to pass fuel to the pilot burner valve means.

9. In a fluid fuel control system: a main valve having a movable closure; a main burner controlled by the main valve; a pilot flame burner; valve means operated by movement of the closure for controlling passage of fuel to the pilot burner; a supplemental safety valve interrupting flow of fuel to the main burner; a pilot generator operated by the heat of the pilot flame; a pair of electromagnetically operated pressure control valve devices energized by said generator in parallel; a circuit controller in series with the first of said devices; fluid pressure means operatively connected to said devices for opening said supplemental valve, including a movable pressure operated wall; means forming chambers on opposite sides of said wall; the first device when energized serving to vent one chamber to cause the wall to open the supplemental valve by pressure exerted on the wall by the fluid fuel supply, the second device enabling passage of the fluid to operate the wall when said second device is energized, as well as to pass fuel to the pilot burner valve means; and a by-pass valve around the second device for passing fuel to the valve means and operable upon moving the main valve closure to fully closed position.

10. In a fluid fuel control system: a main burner; a pilot burner; a main valve for controlling flow to the main burner; a supplemental valve for completely interrupting flow of fuel to the main valve; means connected to the supplemental valve adapted to operate the supplemental valve to open position; valve means for passing fuel to the pilot burner; means responsive to the existence of a pilot flame for conditioning said supplemental valve operating means to open the supplemental valve, and for closing said supplemental valve upon failure of said pilot flame; and means operating in accordance with temperature requirements of a space for moving said supplemental valve operating means to open and close the said supplemental valve.

11. In a fluid fuel control system: a main burner; a pilot burner; a main valve for controlling flow to the main burner; a supplemental valve for completely interrupting flow of fuel to the main valve; valve means for passing fuel to the pilot burner; fluid pressure means utilizing the pressure of the fluid fuel for opening the supplemental valve; means responsive to pilot flame failure for interrupting flow of fluid pressure to said supplemental valve opening means; and means operating in accordance with temperature requirements of a space to cause said fluid pressure to open the supplemental valve, or to render said fluid pressure ineffective to open said supplemental valve.

12. In a fluid fuel control system: a main burner; a pilot burner; a main valve for controlling flow to the main burner; a supplemental valve for completely interrupting flow of fuel to the main valve; means connected to the supplemental valve to operate the supplemental valve to open position; valve means for passing fuel to the pilot burner; means responsive to the existence of a pilot flame for conditioning said supplemental valve operating means to open the supplemental valve, and for closing said supplemental valve upon failure of said pilot flame as well as for interrupting flow of fuel to the pilot valve means upon pilot flame failure; a by-pass valve operated by movement of the closure to fully closed position, for passing fuel to said valve means; and means operating in accordance with temperature requirements of a space for moving said supplemental valve operating means to open and close the said supplemental valve.

13. In a fluid fuel control system: a main burner; a pilot burner; a main valve for controlling flow to the main burner; a supplemental valve for completely interrupting flow of fuel to the main valve; valve means for passing fuel to the pilot burner; fluid pressure means utilizing the pressure of the fluid fuel for opening the supplemental valve; means responsive to pilot flame failure for interrupting flow of fluid pressure to said supplemental valve opening means, as well as for interrupting flow of fuel to said pilot valve means; means operating in accordance with temperature requirements of a space to cause said fluid pressure to open the supplemental valve or to render said fluid pressure ineffective to open said supplemental valve; and a by-pass valve operated by movement of the closure to fully closed position, for passing fuel to said valve means.

14. In a valve structure: a valve body forming a first chamber and having an inlet passage and an outlet passage, one of said passages communicating with said chamber, said body defining a plug closure seat having a transverse opening communicating with the chamber; a plug closure seated in the seat; a supplemental valve closure movable across said transverse opening to close the same; means forming a second fluid pressure chamber; and a movable wall in said second chamber operated by fluid pressure for operating said supplemental valve closure.

15. In a valve structure for controlling the flow of a fluid medium: a valve body defining a first fluid chamber and having an inlet passage and an outlet passage, one of said passages communicating with said chamber; said body defining a plug closure seat having a transverse opening communicating with the chamber; a plug closure seated in the seat; a supplemental movable valve closure cooperating with said transverse opening; a movable wall defining, with said valve body, a second fluid chamber; means for transmitting movement of the wall to move the supplemental valve closure to open position; and means controlling the flow of the fluid medium to said second chamber for operating the closure member.

16. In a fluid fuel control system: a main burner; a pilot burner; a main valve structure including a main valve seat and a movable main valve closure for controlling flow of fuel to the main burner; a safety valve structure biased to closed position and in series with the main valve structure and having a movable safety valve closure; means operated by pressure of the fluid fuel to move the safety valve closure to open position; a pilot burner valve structure; means affected by the pilot flame for rendering the fluid fuel pressure effective to open the safety valve closure; a condition responsive device and means controlled jointly by said device, as well as by the means affected by the pilot, for operating said safety valve closure to open position.

17. In a fluid fuel control system: a main burner; a pilot burner; a main valve structure including a main valve seat and a movable main valve closure for controlling flow of fuel to the main burner; a supplemental valve structure in series with said main valve structure and having a movable closure biased to closing position; mechanism operable by the fluid pressure of the fuel for moving said supplemental valve closure to open position; a condition-responsive means for supplying fluid fuel pressure to the said mechanism for opening said supplemental valve closure, only when the pilot flame is in existence and the condition responsive means is in a position requiring operation of the main burner.

18. In a fluid fuel control system: a main burner; a pilot burner; a main valve structure including a main valve seat and a movable main valve closure for controlling flow of fuel to the main burner; a supplemental valve structure in series with said main valve structure and having a movable closure biased to closing position; mechanism operable by the fluid pressure of the fuel for moving said supplemental valve closure to open position; said means including a movable wall defining a chamber on each side of the wall; means responsive to the existence of the pilot flame for applying fluid fuel pressure to both sides of said wall; and condition responsive means for venting the chamber on one side of the wall to cause the fluid pressure on the other side of the wall to move the supplemental valve closure to open position.

19. In a valve structure having a main rotary valve as well as a supplemental valve in series with the main valve, said supplemental valve having a movable valve closure; fluid pressure means for operating said supplemental valve closure; an operator for the rotary valve and including a lost motion connection; means for controlling the passage of fluid to the fluid pressure means; and means placing said controlling means in condition so that the controlling means may control the passage of fluid, including an auxiliary valve mechanism operated by the operator upon movement of the operator past closing position of the rotary valve.

20. In a valve structure: means forming a main valve seat; said seat having ports through which fluid may pass; a rotary valve closure cooperating with the seat to control the flow of fluid through the ports; means forming a supplemental valve seat; a supplemental valve closure cooperating with the seat; said supplemental valve closure controlling in series the flow of fluid through said ports; said rotary valve closure and said main valve seat being provided with a second set of ports controlled by the rotary closure; fluid pressure means for operating the supplemental valve closure; means conditioning the fluid pressure means so that it may become operative, including an auxiliary valve in series with said second set of ports; means for operating the rotary closure; said means including a lost motion connection; and means connected to said operating means for opening the auxiliary valve upon moving the operating means to main valve closed position.

21. In a fluid fuel control system including a main burner and a pilot burner: a valve body defining a fluid chamber and having an opening communicating with said chamber; said body defining a plug closure seat having a port communicating with the chamber; a plug closure seated in the seat; a supplemental movable valve closure controlling said port; fluid pressure means for operating said supplemental valve closure; an operator, including a lost motion connection, for rotating the plug closure; a pilot valve structure controlled by the plug; an auxiliary valve in series with the pilot valve structure and operated to open position by the operator after the plug is in valve closing position; and means responsive to the existence of a flame at the pilot burner for passing fuel to the pilot burner through said pilot valve structure; said auxiliary valve by-passing said responsive means.

22. In a valve structure for controlling fluid flow: a valve body having an inlet passage and an outlet passage; a flexible movable wall defining, with the body, a chamber, one of said passages communicating with said chamber; said body defining a plug closure seat having a transverse opening communicating with the chamber; a plug closure seated in the seat; a supplemental valve closure cooperating with said transverse opening; means forming a fluid pressure chamber; a movable wall in said fluid pressure chamber and operated by pressure of the controlled fluid on one side of the movable wall in said fluid pressure chamber; and means cooperating with both said movable walls for operating said supplemental valve closure.

WILLIAM A. RAY.

REFERENCES CITED

The following references are of record in the file of this patent:

UNITED STATES PATENTS

| Number | Name | Date |
|---|---|---|
| 1,715,650 | Fonseca | June 4, 1929 |
| 1,820,510 | Tuck | Aug. 25, 1931 |
| 2,213,844 | Mantz | Sept. 3, 1940 |
| 2,273,127 | McGoldrick et al. | Feb. 17, 1942 |
| 2,297,718 | Ray | Oct. 6, 1942 |
| 2,305,242 | English | Dec. 15, 1942 |
| 2,306,904 | Ray | Dec. 29, 1942 |
| 2,318,136 | Alfrey | May 4, 1943 |
| 2,318,823 | Wantz | May 11, 1943 |
| 2,353,759 | Ray | July 18, 1944 |
| 2,372,537 | Wantz | Mar. 27, 1945 |
| 2,383,676 | Paille | Aug. 28, 1945 |
| 2,395,470 | Ewing | Feb. 26, 1946 |
| 2,403,611 | Ray | July 9, 1946 |